(No Model.)
M. T. HANCOCK, E. C. ATKINS & N. H. ROBERTS.
ROTARY PLOW.
No. 496,119.
Patented Apr. 25, 1893.
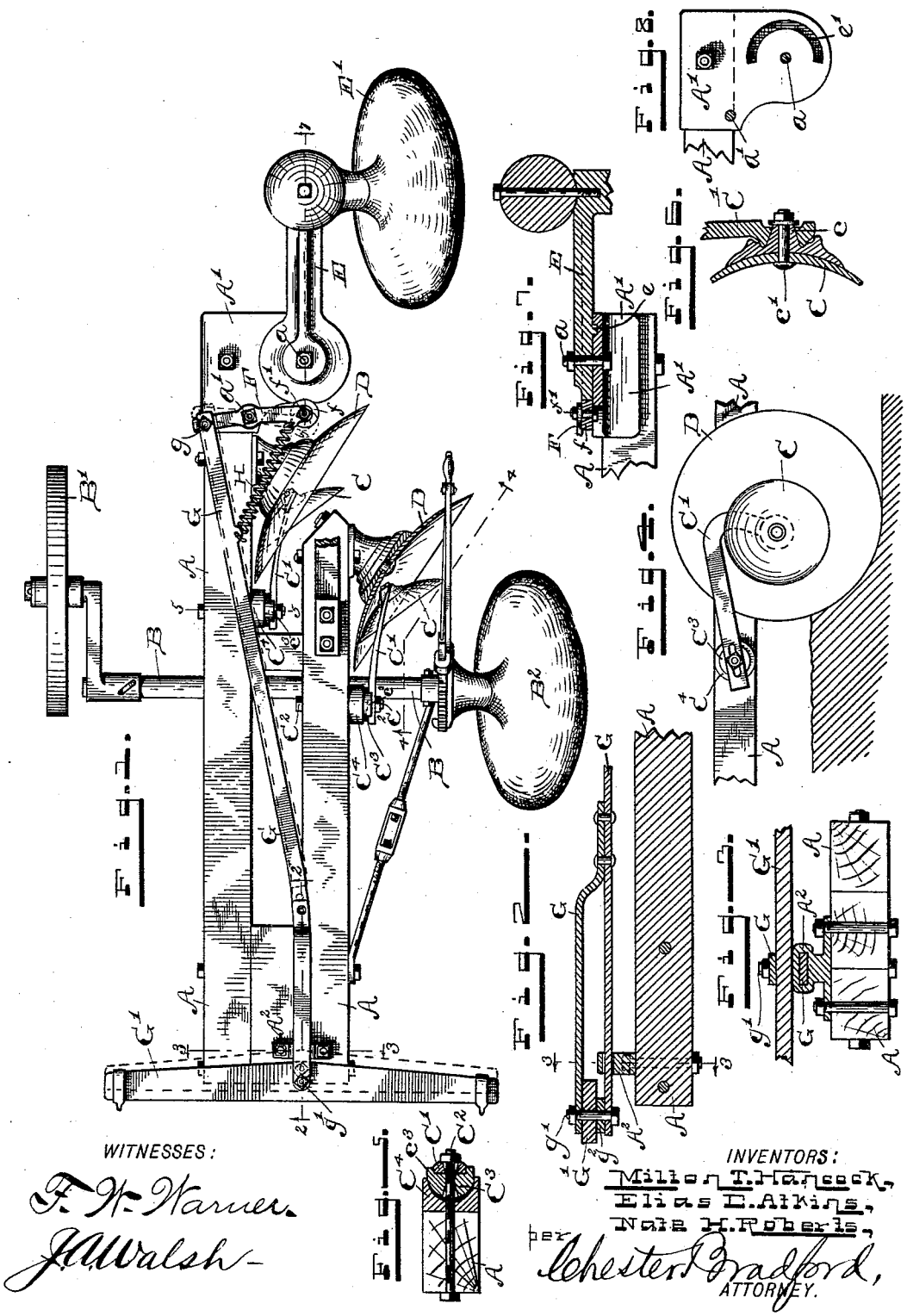
WITNESSES:
INVENTORS:
Milton T. Hancock,
Elias C. Atkins,
Nate H. Roberts,
per Chester Bradford,
ATTORNEY.

UNITED STATES PATENT OFFICE.

MILTON T. HANCOCK, OF SHREVEPORT, LOUISIANA, AND ELIAS C. ATKINS AND NATE H. ROBERTS, OF INDIANAPOLIS, INDIANA, ASSIGNORS TO SAID ATKINS.

ROTARY PLOW.

SPECIFICATION forming part of Letters Patent No. 496,119, dated April 25, 1893.

Application filed November 19, 1892. Serial No. 452,544. (No model.)

*To all whom it may concern:*

Be it known that we, MILTON T. HANCOCK, residing at Shreveport, Caddo parish, Louisiana, and ELIAS C. ATKINS and NATE H. ROB-ERTS, residing at Indianapolis, in the county of Marion and State of Indiana, citizens of the United States, have invented certain new and useful Improvements in Rotary Plows, of which the following is a specification.
Our said invention consists in certain improvements on that forming the subject of the application, Serial No. 450,614, of Milton T. Hancock, filed November 1, 1892, whereby auxiliary plowing disks are provided in place of the plow-shares of said application, and whereby the rear guide-wheel may be locked and released by improved mechanism; also in an arrangement whereby said mechanism is operated by the power which draws the plow; and further, by certain attachments which render it automatic, and in details of construction and arrangement, all as will be hereinafter more particularly described and claimed.
Referring to the accompanying drawings, which are made a part hereof, and on which similar letters of reference indicate similar parts, Figure 1 is a top or plan view of a plow embodying our said improvements; Fig. 2 a longitudinal vertical section of the draft-bar and adjacent parts, on the dotted line 2 2 in Fig. 1; Fig. 3 a transverse sectional view of the same on the dotted lines 3 3 in Figs. 1 and 2; Fig. 4 an elevation of the plowing disks and the immediately adjacent parts, as seen from the dotted line 4 4 in Fig. 1; Fig. 5 a transverse sectional view of the fastening for the arm on which the auxilliary disk is mounted, on the dotted line 5 5 in Figs. 1 and 4; Fig. 6 a detail sectional view showing how the auxiliary plowing disk and its arm are connected; Fig. 7 a detail sectional view through the rear swinging arm and adjacent parts, on the dotted line 7 7 in Fig. 1; and Fig. 8 a top or plan view of the casting upon which the rear swinging arm and locking lever are mounted, said arm and said lever being removed.

In said drawings the portions marked A represent the frame-work of the plow; B the axle; C the auxiliary plowing disks; D the main plowing disks; E the pivoted arm carrying the rear guide-wheel; F a lever carrying a stop for said arm; G a bar attached to said lever and forming also the draft-bar; and H a spring attached to said lever and to the draft-bar.

The frame-work A, axle B, land wheel B', and guide-wheel B², and the parts immediately connected therewith, are similar to those of the application, Serial No. 450,614, above referred to.

The auxiliary plowing disks C are located within and preferably near the front edges of the main plowing disks D, and are specially adapted to the plowing of ground having turf or stubble. In plowing such ground these auxiliary plowing disks skim off a small portion of the ground, including the stubble or turf, and turn it over into the bottom of the furrow which was plowed on the preceding passage of the plow, ready to be buried by the main body of the earth turned by the plowing disks D. In this they take the place of and are superior to the small plow-shares forming a feature of the above mentioned application. They are set at a different angle to the main plowing disks, and we have found that this arrangement secures superior results. These auxiliary plowing disks are mounted upon bars C', and said bars are secured by means of bolts C² to two-part bearings, which consist of the convex-surfaced parts C³ and the cup-shaped or concave-surfaced parts C⁴, said bolts passing through said parts, and also through the frame timbers, as shown. The parts C³ preferably have lips c³ between which the bars C' fit, and whereby they are held firmly thereon when the bolts are screwed up. The opening through the center of said parts C³ is tapered, as shown most plainly in Fig. 5, and thus said parts may be shifted relatively to the parts C⁴, and not be prevented from being so shifted by said bolt, the smallest point of the hole being at the center of the circle from which the curvature of the surface of said part is struck. Said bar C' at the other end is formed to fit over the spindle c on the disk C, and form a bearing in which said spindle will turn. These parts are so formed at the point of union as to house in the bearing effectually and prevent dirt from entering, as shown.

The main plowing disks D are similar to those of said aforementioned application, and are, therefore, not described herein, except in connection with the other parts.

The arm E is mounted upon the casting A' by a pivot $a$, and is adapted to turn thereon. It carries the rear guide-wheel E'. Said arm is generally similar to that in said aforementioned application, but, instead of the holding devices there shown and described, it is provided simply with a depression or notch in the edge of the circular plate in which it terminates, preferably substantially on the opposite side of the pivot to the point where the rear guide-wheel is secured thereto. It is preferably also provided with a fixed stop $e$, as will be presently described.

The lever F is pivoted at $a'$ to the casting A', and extends out to opposite the notch or depression in the edge of the plate forming a part of the structure of the arm E with which it is adapted to engage at this point. It is preferably provided with an anti-friction roller $f$, which is the means of direct engagement. To the other end this lever is pivoted to the draft-bar G by a pivot $g$, and is operated thereby.

The casting A' is secured rigidly to and forms a part of the frame A. It is of sufficient size to form bearings for both the arm E and the lever F, and thus the pivots on which said arm and said lever turn are both in the same metal part, and are thereby held accurately in the same relation to each other, and said relation is not liable to be disturbed because of any shifting of relative positions, as might be the case if they were mounted on separate parts. Within the top surface of this casting A', concentric with the pivot $a$ which secures the arm E thereto, is a semi-annular groove $e'$ (it might be a perforation), into which the projection $e$ on the under side of the arm E extends. This groove is continued that distance which it is desired shall be the extreme limit of the travel of said arm in each direction, and said arm is stopped in said travel when said projection reaches an end of said groove, as will be readily understood.

The draft-bar G runs forward from the point where it is connected to the lever F (by means of the pivot bolt $g$), to a point at or near the front of the machine, where it is connected to a double-tree G', which is of an ordinary and well known construction. The front end of said draft-bar is preferably bifurcated, and extends above and below said double-tree, and is united thereto by a bolt $g'$ which passes through the several parts, as shown in Fig. 2. As also shown in said figure, and in Fig. 3, the lower member of the draft-bar passes through a casting $A^2$ mounted on the frame-work A, and is provided with a boss $g^2$ in front of said casting. The parts are so positioned that when the pull on the draft-bar is relieved, the said draft-bar will be drawn back, so that said boss will come in contact with said casting. The travel of said draft-bar is thus definitely limited, and it is not permitted to be thrown back so far as to swing against and thus interfere with any other of the working parts of the plow. As will be noticed, the bifurcation of the draft-bar extends back for some distance, and thus the double-tree is permitted to swing around to nearly to right angles with said draft-bar in either direction, thus enabling the pull in turning the plow to come upon the casting $A^2$ with an almost direct sideway strain, instead of tending to draw the draft-bar forward, which, if it should occur, would, by means of the lever F, be likely to interfere with the turning of the arm E and its guide-wheel. The boss $g^2$ besides acting as a stop, as above described, keeps the double-tree above the casting $A^2$, and thus out of contact therewith in turning. The operation is, when the team or other motive power is exerted on the double-tree, that the draft-bar is pulled forward, and operates the lever F, making an engagement with the notch or depression in the edge of the plate of the arm E, thus locking said arm and the guide-wheel thereon securely in position, said locking being maintained with all the power which is required to pull the plow, and said guide-wheel is thus held in the desired relation during the operation of plowing. When, however, the power is released, as when the team stops, or arrives at the end of the furrow and starts to turn, the arm E is released, and the guide-wheel can turn on its pivot, as is necessary in a machine of this character. When the plow reaches its position for plowing again, and the force is re-applied, the engagement or locking is re-effected, this being aided by the form of the notch or depression, which, as will be observed, is given a somewhat gradual incline, as the sides taper from the lowest point, thus aiding in guiding the roller $f$ back to said lowest point, and bringing the arm and guide-wheel thereon exactly in line, if they shall not have reached precisely that position during the pulling of the plow into position.

The spring H is attached to the lever at a point near the roller $f$ at one end, and to the other end to the draft-bar G. The object of this is to withdraw said lever from engagement with the arm E more quickly and certainly than if such a spring were not provided. Said spring, however, is not strong enough to materially affect the pull of the team or other power on the lever.

Having thus fully described our said invention, what we claim as new, and desire to secure by Letters Patent, is—

1. The combination, in a rotary plow, of a main plowing disk, and a smaller auxiliary plowing disk arranged within and at or near the front edge of said main plowing disk, substantially as set forth.

2. The combination, in a rotary plow, of a main plowing disk, and a smaller auxiliary plowing disk arranged within the main disk and set at a different angle to said main disk, substantially as shown and described.

3. The combination, in a rotary plow, of a main plowing disk, a smaller auxiliary plowing disk, arranged within the main disk and an adjustable bearing for carrying said auxiliary plowing disk, whereby its relation to the main plowing disk may be varied, substantially as set forth.

4. The combination, in a rotary plow, of a main plowing disk, a smaller auxiliary plowing disk, a bar on which said auxiliary plowing disk is mounted, a two-part bearing, one convex-surfaced and the other cup-shaped or concave-surfaced, to which said arm is attached, and a bolt passing through the several parts by which said attachment is effected, substantially as set forth.

5. The combination, in a rotary plow, of a main plowing disk, a smaller auxiliary disk arranged within the forward portion of said main disk, and set at a different angle to said main disk, substantially as shown and described.

6. The combination, in a rotary plow, with a rear guide-wheel therefor, of an arm pivoted to the frame-work and carrying said guide-wheel, said arm having a substantially circular end and a notch therein, a lever the end whereof is adapted to engage with said notch, and a draft bar or rod running toward the front of the plow, whereby said lever is operated and said arm thus locked in the desired position, substantially as set forth.

7. The combination, in a rotary plow, with the rear guide-wheel, of a swinging arm carrying said guide-wheel and provided with a notch or depression in an edge on the opposite side of the pivot from said guide-wheel, a lever having an anti-friction roller on the end adapted to fit into said notch or depression, and a connection to the other end of said lever whereby it may be operated and the arm thus locked in position, substantially as set forth.

8. The combination, in a rotary plow, with the rear guide-wheel, and the swinging arm on which the same is mounted, said arm being pivoted with a notch or depression, of a draft-bar connected to the other end of said lever and running forward to a point at or near the front end of the plow, where the power which draws the plow may be applied thereto, said lever being operated and the guide-wheel thus locked in position by the same power which draws the plow, substantially as set forth.

9. The combination, in a rotary plow, with the rear guide-wheel and the swinging arm carrying the same, of a lever mechanism adapted to engage with and lock said arm, and a spring attached to said mechanism and to the frame-work, and operating reversely to the pull of said mechanism, thus aiding to release the engagement when the power which operates the same ceases or is removed, substantially as set forth.

10. The combination, in a rotary plow, of the plowing disks, guide wheels, a swinging arm on which the rear guide wheel is mounted, a lever mechanism engaging therewith, said lever mechanism being operated by the same power which pulls the plow, and a spring whereby the engagement of said mechanism with said arm is quickly released when the pull of the power on the mechanism is relieved, substantially as set forth.

11. The combination, in a rotary plow, with the swinging arm which carries the rear guide-wheel, said swinging arm being provided with a notch or depression in a substantially circular edge, of a lever mechanism for locking said arm in position, the immediately engaging end whereof is provided with an anti-friction roller which enters said notch or depression, substantially as shown and described.

12. The combination, in a rotary plow, of a draft-bar extending to mechanism of the plow, the front end whereof is bifurcated, one member of which passes through a support and is provided with a boss in front of said support, and the double-tree secured between said boss and the other member, and thereby enabled to swing over said support, said boss also forming a stop limiting the movement of the draft-bar, substantially as set forth.

In witness whereof we have hereunto set our hands and seals, at Indianapolis, Indiana, this 15th day of November, A. D. 1892.

MILTON T. HANCOCK. [L. S.]
ELIAS C. ATKINS. [L. S.]
NATE H. ROBERTS. [L. S.]

Witnesses:
CHESTER BRADFORD,
JAMES A. WALSH.